United States Patent [19]

Brown, Jr.

[11] 4,100,418

[45] Jul. 11, 1978

[54] METHOD OF AND MEANS FOR FILTERING THE INFRARED RAYS FROM A SOURCE OF UV RADIATION

[75] Inventor: George Emmett Brown, Jr., Cincinnati, Ohio

[73] Assignee: Gene D. Hoffman, Cincinnati, Ohio

[21] Appl. No.: 774,234

[22] Filed: Mar. 4, 1977

[51] Int. Cl.[2] ........................... G21K 3/00; G01J 1/42

[52] U.S. Cl. ..................................... 250/510; 250/373

[58] Field of Search ................................ 250/373, 510

[56] References Cited

U.S. PATENT DOCUMENTS

| | | | |
|---|---|---|---|
| 3,675,477 | 7/1972 | Allen | 250/510 X |
| 3,876,880 | 4/1975 | Guicherd | 250/510 |

*Primary Examiner*—Alfred E. Smith

*Assistant Examiner*—Janice A. Howell

*Attorney, Agent, or Firm*—J. Warren Kinney, Jr.

[57] ABSTRACT

The ultraviolet and infrared radiation from a source of UV radiation is subjected to the selective infrared radiation-filtering action of steam which transmits the ultraviolet rays while absorbing the infrared rays.

27 Claims, 5 Drawing Figures

METHOD OF AND MEANS FOR FILTERING THE INFRARED RAYS FROM A SOURCE OF UV RADIATION

FIELD OF THE INVENTION

The field of the invention relates to a generator for "cool" ultraviolet light.

DESCRIPTION OF THE DRAWINGS

FIG. 1 is a perspective view illustrating an application of the subject invention as applied to means for curing, by ultraviolet radiation and steam, the radiation-curable decorative and/or protective coating on a heat-sensitive substrate of paper, textile material or the like.

DESCRIPTION OF THE INVENTION

Figure 1:
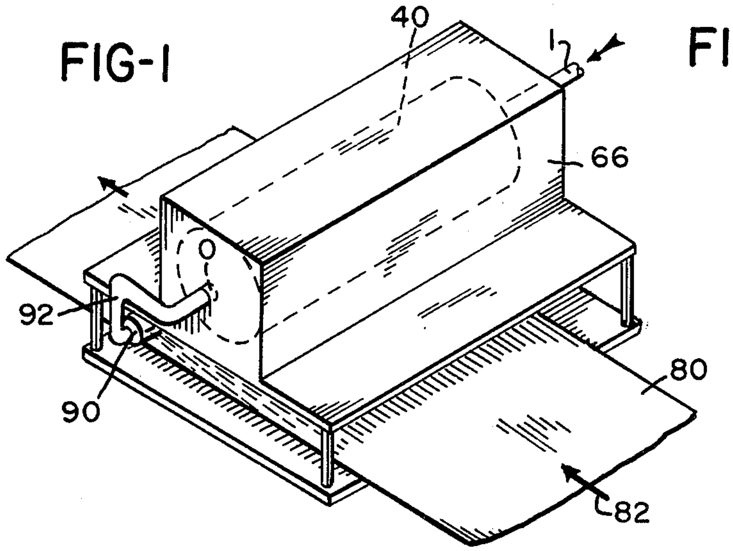

A source of radiant energy such as, by way of example, a UV lamp 10 is suitably housed or encapsulated within an elongate, substantially cylindrical tube 12. The opposite ends of lamp 10 terminate at, and are supported by, a pair of axially aligned electrodes 14 and 16, each of which are secured to, carried by, and project through the centrally disposed opening 18 of a pair of stainless steel electrode plates 20 and 22.

Figure 5:
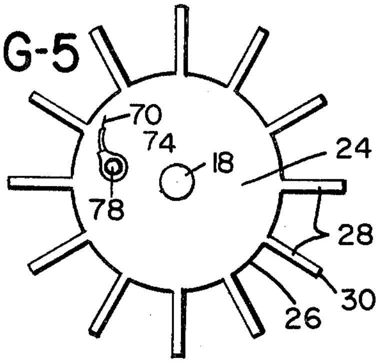
FIG. 5 is a plan view of an electrode plate which constitutes a detail of the apparatus of FIGS. 1–4.

As best illustrated in FIG. 5, electrode plates 20 and 22 comprise a solid intermediate portion 24 which extends outwardly from the central opening 18 to a peripheral edge 26, from which a plurality of fins 28 project, as illustrated, wherein each fin includes an outer terminal end 30.

Tube 12 and the electrode plates 20 and 22 define a moisture-impervious first chamber A in which lamp 10 is housed, and when suitably energized, the tube will operate at its rated operating temperature, such as, by way of example, at 500° C for a commercial 24 inch lamp.

A second elongate, substantially cylindrical tube 40 is disposed in spaced, circumscribing, axial relationship with tube 12 for defining an elongate passageway Q along the entire length of tube 12, wherein the spaced electrode fins 28 are disposed at opposite ends of said passageway. Preferably tube 40, like tube 12, is of actinic quartz, being transparent to ultraviolet rays in the 2000 A° - 4000 A° range.

In the preferred embodiment of the invention, the outer terminal ends 30 of fins 28 of the electrode plates 20 and 22 abuttingly engage the inner surface 42 of tube 40 for thereby disposing and maintaining outer tube 40 in spaced axial alignment with inner tube 12.

The opposite ends 44 and 46 of outer tube 40 abuttingly engage the inner surfaces S of end plates 50 and 52 respectively which are provided with a circular recess R dimensioned to snugly receive the outer diameter of outer tube 40 to provide a vapor-proof seal.

End plate 50 is provided with an inlet port I whereas end plate 52 is provided with an outlet port O.

Figure 3:
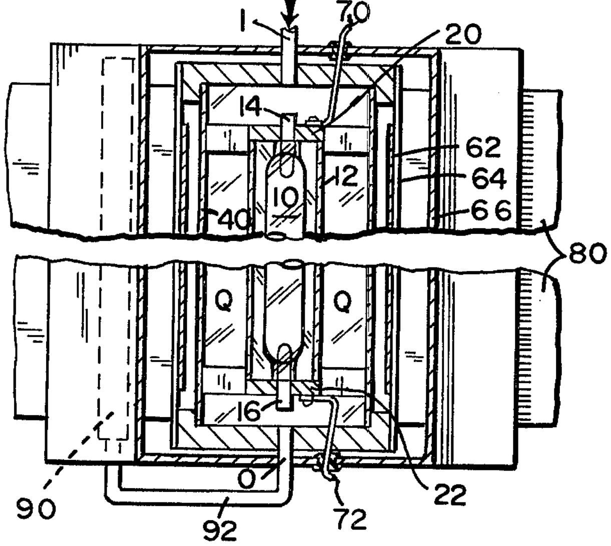
FIG. 3 is a view taken on line 3—3 of FIG. 2.
Figure 4:
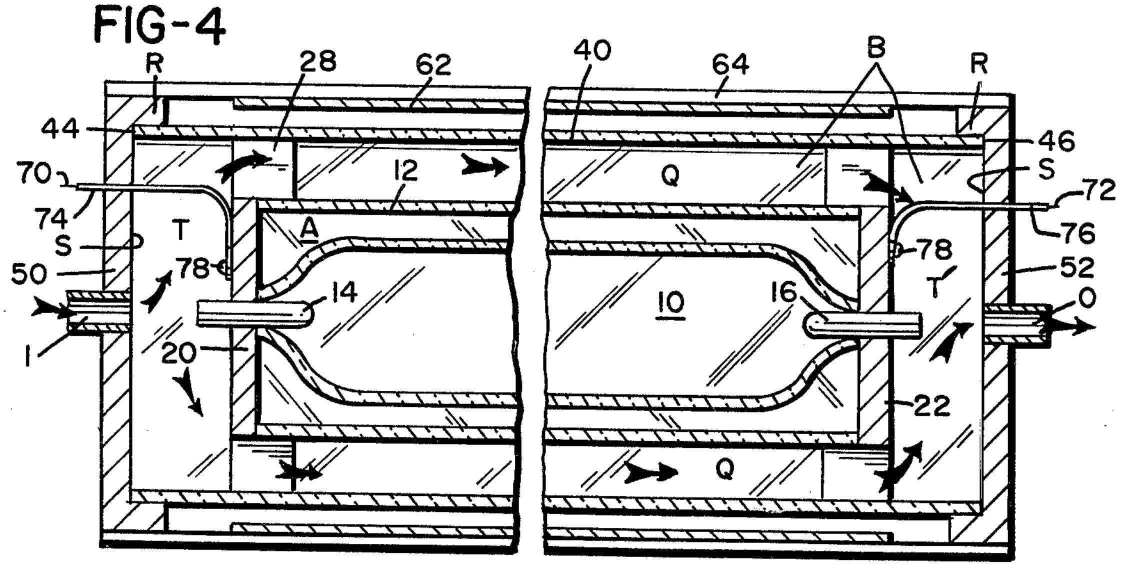
FIG. 4 is an enlarged sectional view of a device which embodies the present invention wherein the relationship between the steam filter and the source of UV radiation is illustrated.

As best illustrated in FIGS. 3 and 4, the outer surfaces of electrode plates 20 and 22 are spaced laterally from the respective end walls 50 and 52 for providing end areas T and T′ therebetween, wherein said end areas T and T′ are in open communication with one another by reason of the elongate passageway Q as defined by the inner and outer tubes 12 and 40.

Electrodes 14 and 16 are adapted to be energized from a suitable source, not illustrated, by means of electrical conductors 70 and 72, respectively, suitably housed within moisture and heat impervious sheaths such as, by way of example, of a silicone polymer, a glass cloth sheathed silicone polymer, or the like, 74 and 76. Conductors 70 and 72 are disposed in conducting relationship with their respective electrode plates 20 and 22 as at 78.

The end areas T–T′ and passageway Q define a second chamber, B, which is moisture-impervious and completely encloses or houses the first chamber A.

Steam, from a suitable source, not illustrated, is introduced into chamber B via inlet port I into end area T, thence into passageway Q to end area T′ and thence into outlet port O, for thereby providing a steam barrier or filter which completely encompasses the entire light emitting length of the lamp, and through which filter the rays from lamp 10 must pass. The steam within chamber B also completely encompasses the outer surfaces of the electrode plates 20 and 22 of the first chamber A.

I have determined that steam has the unique property of absorbing or otherwise effectively blocking the passage of infrared rays while permitting the substantially unimpaired passage of ultraviolet rays from a source of radiant energy, such as, by way of example, a mercury vapor arc lamp 10.

The following example will demonstrate the degree to which steam will prevent the passage of infrared rays while passing ultraviolet rays from a source of radiant energy.

Steam was injected into a metal hood containing 16 1000 watt mercury vapor lamps each having an aluminum reflector. A web of paper 0.002 thick, coated with a resin containing an ultraviolet sensitive curing agent of the type that was oxygen inhibited was passed beneath the hood with all of the 16 lamps on, generating ultraviolet radiation and about 8000 watts of infrared radiation. The paper emerged from beneath the hood with the resin fully cured within 1½ seconds with the paper uneffected by the heat generated by the lamps. Thereafter movement of the paper web beneath the hood was stopped with all 16 of the lamps on, as aforesaid, and after exposure for 10 minutes at a distance of ¾ inch from the lamps the paper as removed from beneath the hood was entirely free of discoloration or charring.

The steam supply to the hood was then turned off, and within three seconds as the steam within the hood was being dissipated, the paper web being subjected to the radiant energy from the lamps within the hood, burst into flame.

To more fully appreciate the tremendous amount of infrared radiation generated by a 1000 watt mercury vapor lamp, it may be noted that a piece of 2 × 4 wood spaced at a distance of one foot from a 1000 watt UV lamp will ignite within 15 seconds.

Since steam is an infrared emitter as well as an absorber, the degree of absorption of infrared energy in passageway Q of chamber B is proportional to the rate of steam flow, that is, the higher the rate of steam flow, the greater the absorption of infrared energy by the steam filter.

I have determined that the rate of steam flow through chamber B may be easily and accurately controlled by means of a valve, not illustrated, in the steam supply line, to inlet I whereby to provide and maintain a steam temperature at outlet O from 215° F to 220° F, in those instances in which the temperature of the steam entering inlet I is 212° F, at atmospheric pressure. The ultraviolet radiation thus produced may be characterized as "cool" since it is free or substantially free of infrared rays. Such "cool" ultraviolet radiation is ideally adapted for exposure to thermally sensitive substrates such as paper, textiles, thermoplastics, food, and the like.

Higher steam temperatures at outlet O may be permitted when thermally insensitive material such as glass, metal, and the like, is being subjected to the resultant "cool" ultraviolet radiation from the steam filter.

It will be understood that the source of steam must have sufficient pressure to overcome the friction losses and back pressure due to flow obstruction, to insure an adequate rate of steam flow through chamber B. The steam, under pressure from 5 to 20 p.s.i. enters inlet I at 212° F or at the boiling point of water, as saturated steam at atmospheric pressure.

The passage of steam through passageway Q not only effectively absorbs infrared energy from the light-emitting length of lamp 10, it also effectively cools the electrode plates 20–22 in the end areas T and T' to such an extent or degree that outer surfaces of said plates and their heat dissipating fins 28 is in the neighborhood of 250° - 275° F well below 300° F. By thus cooling the electrode plates the life of lamp 10 is increased many fold.

Since infrared radiation is thus absorbed by the steam, the resultant "cool" ultraviolet rays may be utilized in those applications where high intensity "cool" ultraviolet radiation is desired, but wherein such ultraviolet rays could not heretofore be successfully utilized by reason of the ever-present infrared radiation which accompanied and was inseparable from the ultraviolet radiation.

Figure 2:
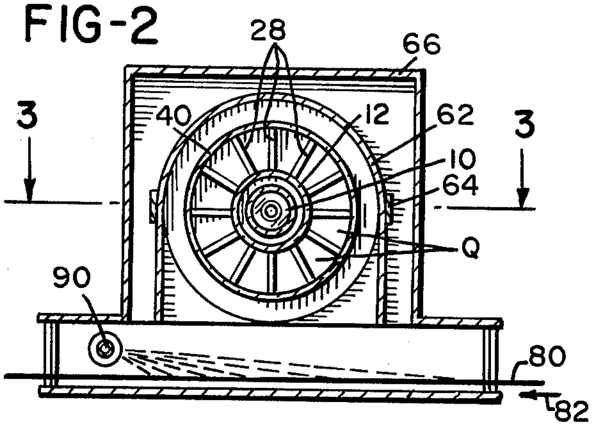
FIG. 2 is a vertical section of FIG. 1.

With particular reference now to FIGS. 1 and 2, the numeral 80 designates a length of material at least one surface of which is provided with a radiation-curable material in the presence of ultraviolet rays and in an inert environment. Heretofore nitrogen, helium, argon, neon, carbon dioxide, or other inert gas, has been flooded onto those portions of a web of material containing radiation-curable material undergoing exposure to ultraviolet rays, for displacing the thin film of air on the surface of the radiation-curable material.

I have ascertained that the use of inert gaseous materials such as, by way of example, nitrogen, etc. is not required but that uniformly satisfactory, if not superior results can be obtained in those instances in which the surface of the radiation-curable material is subjected to "cool" ultraviolet rays in the presence of dry, that is, super-heated steam of a temperature sufficiently high to minimize condensation of the steam on the surface of the material being treated, cured, or the like.

In FIG. 2 the numeral 90 designates a source of dry, super-heated steam which is continuously discharged onto the upper coated surface of web 80 while said web is being advanced to the left in the direction of the headed arrow 82 whereby to be exposed to the "cool" ultraviolet rays from the lamp 10 while being literally immersed in a atmosphere of dry, super-heated steam, which if desired, may be obtained from outlet O of housing 60 via a well-insulated steam conduit 92.

In passing it will be noted that steam is not an inert gas in the sense that nitrogen, helium, carbon dioxide, and the like, are inert.

The subject device is ideally suited for use in those instances and applications wherein "cool" ultraviolet radiation is utilized to dry, cure, or otherwise react with various types of finishes, coatings, pigments, and the like which are classified as radiation-curable, and in this connection, reference is made to my co-pending patent application Ser. No. 774,233 "Radiation Curing" filed of even date and now abandoned.

It should, of course, be understood that the subject device is ideally adapted to generate cool ultraviolet radiation absent the customary infrared components thereof whereby it is now feasible for the first time to employ extremely high wattages without having to be concerned with the tremendous heat radiated via the infrared rays.

A steam-enveloped ultraviolet tube of high wattage may be utilized in sterilizing food products such as, by way of example, fresh and/or wrapped meat for effectively killing the surface bacteria thereon, but without elevating the temperature of the meat product being so treated.

Uniformly satisfactory results have been obtained in those instances in which the effective lighted-length of lmap 10 is 25 inches and wherein the wattage input is 200 watts/inch of lighted length, for a total of 5000 watts. Lamp 10 operates at a temperature of 500° C within the confines of tube 12 and the electrode plates 20 and 22.

The steam passing through passageway Q literally absorbs the infrared radiation generated by the lamp, while permitting the passage of ultraviolet radiation therefrom.

The temperature of the steam as it leaves port O is always greater than the temperature of the steam entering port I by reason of the heat imparted thereto by the infrared radiation absorbed by the steam.

By controlling the rate of flow of steam through the device such that the temperature at outlet O is in the 215°–220° F range the rate of steam flow will be adequate to absorb any wattage of infrared radiation from lamp 10, and the temperature of the steam leaving outlet O will be sufficiently superheated and dry, by way of example, to be utilized as illustrated in FIG. 2 for application, via conduit 90, directly onto the upper surface of web 80; of if the steam is not so used it may be exhausted or it may be returned to the source from which the steam is supplied to inlet I.

Returning now to the drawings, the numeral 62 denotes a substantially U-shaped reflector which is anchored in place by a mounting strap 64, the opposite ends of which are suitably secured to end plates 50 and 52, whereas the numeral 66 denotes a housing in which the device is contained in such a manner as to prevent the uncontrolled escape of ultraviolet radiation.

Uniformly satisfactory results have been obtained in those instances in which the spacing between the adjacent surfaces of tubes 12 and 40 is one-half inch when lamp 10 is 24 inches long. This space dimension may be increased to one inch for a 36 inch lamp, and to one and one-half inches for a forty-eight inch lamp. By thus increasing the width of passageway Q of chamber B, the rate of flow of steam therethrough will be comparatively low for all lengths of lamps in order to maintain the temperature of the steam being exhausted from outlet O in the 214° - 220° F range.

It should be understood that if desired an elongate tubular passageway such as Q defined by a pair of spaced inner and outer tubes 12 and 40 may be slipped over at least the light-emitting length of a UV lamp 10 for filtering the rays eminating from the lamp but without utilizing the end areas T and T'. In other words, steam would be supplied to one end of the space between the two tubes and exhausted at the other end, in which event "cool" ultraviolet radiations, absent infrared radiation, would pass from tube 40, however, the cooling effect of the steam on the electrode plates will have been sacrificed.

In summary, what I have provided is a live steam filter for the infrared and ultraviolet components of energy from a source of UV radiation wherein the steam absorbs the infrared radiation while passing the ultraviolet radiation.

What is claimed is:

1. The method of obtaining cool ultraviolet rays from a source of UV radiation which produces both infrared and ultraviolet radiations, which comprises the step of filtering the radiations from said source through steam.

2. The method of absorbing infrared rays from a source of UV radiation which produces both infrared and ultraviolet radiations, which comprises the step of filtering the radiation from said source through steam.

3. The method of absorbing infrared rays while transmitting cool ultraviolet rays from a source of UV radiation which produces both infrared and ultraviolet radiations, which comprises the step of filtering the radiations from said source through steam.

4. The method of absorbing infrared rays while transmitting cool ultraviolet rays from a source of UV radiation, which comprises the steps of:

(a) housing the source of radiation within a moisture-impervious first chamber in which said source of radiation can operate at its rated operating temperature, said chamber being transparent along the light-emitting length of said UV source to infrared and ultraviolet rays, (b) enclosing said first chamber within a second chamber which is transparent along the light-emitting length of said UV source to infrared and ultraviolet rays; and of (c) introducing steam into and through the second chamber so that the steam forms a filter media which absorbs the infrared rays and transmits the ultraviolet rays from said source of radiation.

5. The method as called for in claim 4, wherein in step c the steam is introduced into said second chamber at atmospheric pressure and at the temperature of boiling water.

6. The method as called for in claim 5, wherein the rate of flow of the steam through the second chamber is such as to absorb the wattage of the infrared rays emitted from said UV source.

7. The method as called for in claim 5, wherein the rate of flow of the steam through the second chamber is such that the temperature of the steam leaving said chamber is from 2° F to 8° F higher than the temperature of the steam entering said chamber.

8. The method as called for in claim 4, wherein the source of UV radiation called for in step a comprises a mercury vapor arc lamp.

9. The method as called for in claim 4, wherein the source of radiation called for in step a comprises an elongate mercury vapor arc lamp having an electrode at opposite ends thereof, and wherein said method includes the additional step of (d) providing an electrode plate for each electrode, wherein each said plate includes heat dissipating fins which are located in the said second chamber whereby the passage of steam through said chamber limits the temperature of said plates to less than 300° F.

10. The method of filtering out the infrared rays, while transmitting the ultraviolet rays emitted from a UV lamp which comprises the step of energizing said lamp for generating and emitting both infrared and ultraviolet rays, and of passing the rays emitted from the lamp into a moving stream of steam.

11. A filter for absorbing the infrared rays while transmitting the ultraviolet rays from the light emitting portion of an elongate source of UV radiant energy, which comprises an elongate hollow chamber which is transparent to both infrared and ultraviolet radiation having an inlet end and an outlet end, and means for connecting said inlet to a source of steam, wherein said chamber is dimensioned to be received over the light-emitting portion of the said UV source of energy whereby the radiations from said source are directed through the steam in said chamber.

12. A filter as called for in claim 11, which includes means for securing said elongate chamber relative to and over the light-emitting portion of said source of UV radiant energy.

13. A filter for absorbing the infrared rays while transmitting the ultraviolet rays from the light-emitting portion of an elongate source of UV radiant energy, comprising an elongate, hollow passageway defined by a pair of radially spaced elongate inner and outer tubes each of which are transparent to the ultraviolet and infrared rays emitted from a source of UV radiant energy, said passageway having an inlet at one end and an outlet at the other end thereof, and wherein the inside diameter of the inner tube of the passageway is dimensioned to telescopically receive the light-emitting portion of said source of UV energy, said inlet adapted to be connected to a source of steam whereby the rays emitted from said source will be subjected to the filtering action of steam within said passageway.

14. A filter as called for in claim 13, wherein each of said passageway-defining tubes are of actinic quartz and transparent to ultraviolet rays in the 2000 A° to 4000 A° range.

15. A device for simultaneously cooling the electrode plates of an elongate mercury arc lamp while absorbing the infrared rays and transmitting the ultraviolet rays from said lamp, comprising:

an elongate mercury arc lamp having an electrode projecting from opposite ends thereof;

an electrode plate secured to and carried by each electrode;

a first elongate tube transparent to ultraviolet rays in the 2000 A° – 4000 A° range extending throughout the light-emitting length of said lamp;

means securing the opposite ends of said tube in moisture-impervious relationship with said electrode plates for defining therewith a first chamber in which said lamp is housed;

a second elongate tube transparent to ultraviolet rays in the 2000 A° – 4000 A° range disposed in outwardly spaced relationship with respect to said first tube and extending throughout the light-emitting length of said lamp, for defining with said first tube an elongate passageway having an inlet at one end and an outlet at the other end thereof;

a pair of end plates in spaced parallelism with said electrode plates defining therebetween end areas which are in open communication with said passageway;

an inlet port in one of said end plates and an outlet port in the other end plate;

said second elongate tube and end members defining with said passageway and end areas a second moisture-impervious chamber which completely encapsulates said first chamber; said outlet adapted to be connected to a source of steam whereby steam in said end areas will cool to temperatures below 300° F, the temperature of said electrode plates, and steam within the passageway of said second chamber will filter the ultraviolet and infrared rays emitted from the lamp.

16. A device as called for in claim 15, wherein said electrode plates include a central portion having an outside diameter which corresponds to the outside diameter of said first mentioned tube, and a plurality of radially projecting, laterally spaced, heat dissipating fins which extend from said central portion, said fins being disposed across and at opposite ends of said passageway.

17. A device as called for in claim 16, wherein the outer surface of the end adjacent portions of the first elongate tube is disposed in contacting relationship with the underside of inwardly projecting portions of the fins of the electrode plates, and wherein the inner surface of portions of the second elongate tube is disposed in contacting relationship with the outer ends of said fins whereby the length of said fins determines the spacing between said first and second tubes.

18. A device as called for in claim 17, wherein the outer surface of the end adjacent portions of the second elongate tube projects axially beyond the fins of the electrode plates toward the end plates and terminate in contacting relationship with the undersurface of an annular recess which circumscribes and projects inwardly from the inner surface of said plates.

19. Apparatus for in-line irradiation treatment of a radiation-curable, moving product with cool ultraviolet rays and dry steam comprising:

(a) an elongate source of UV radiation;

(b) an elongate steam filter for the infrared and ultraviolet rays emitted from said source encompassing the light-emitting portion of said source;

(c) said filter including an inlet for the introduction of steam which absorbs the infrared rays and transmits the ultraviolet rays from said source of UV radiation;

(d) means mounting said filter-encompassed source of UV radiation above and transversely of a support for said moving product;

(e) means disposed above and transversely of said support through which dry steam from the filter is discharged for creating and maintaining an atmosphere of dry steam at the surface of said moving product; and (f) means directing the filtered cool ultraviolet rays from said source onto the surface of said moving product.

20. A device as called for in claim 19 wherein the source of UV radiation comprises a mercury vapor lamp and wherein the steam filter includes a pair of laterally spaced tubes of actinic quartz which are transparent to ultraviolet rays in the 2000A° - 4000A° range wherein said tubes define the inner and outer walls of the steam filter through the light-emitting length of said lamp.

21. A device as called for in claim 19 wherein the means for directing filtered cool ultraviolet rays from the lamp onto the surface of said moving product comprises an arctuate reflector.

22. A device as called for in claim 19 wherein the dry steam is discharged onto the moving product throughout the width thereof and in a direction opposed to the direction of movement of the product.

23. A device as called for in claim 19 wherein the means for directing filtered cool ultraviolet rays onto the moving product is disposed in advance of the means through which dry steam is discharged onto said moving product.

24. The method of obtaining cool ultraviolet rays, absent the presence of infrared rays, from a source of UV radiation by means of a steam filter, and of utilizing steam leaving said filter as the source of an atmosphere at the surface of a radiation-curable moving product which is subjected to the said ultraviolet rays which comprises the steps of:

(a) energizing said source of UV radiation whereby to emit infrared and ultraviolet rays;

(b) housing the light-emitting length of the source of UV radiation within a steam filter, the steam-confining walls of which are transparent to ultraviolet radiation in the 2000A° - 4000A° range;

(c) causing steam to pass through said filter at a rate sufficient to absorb the infrared rays emitted from said source, while transmitting the ultraviolet rays;

(d) directing the filtered ultraviolet rays from said source onto the radiation-curable surface of said moving product;

(e) and of exhausting steam from said filter onto the moving surface of said moving product for creating and maintaining an atmosphere of dry steam thereon.

25. The method as called for in claim 24, wherein the temperature of the steam exhausted from the filter is from 2° to 8° F higher than the temperature of steam entering said filter in those instances in which the substrate of the moving product is thermally sensitive.

26. The method as called for in claim 24, wherein the amount by which the temperature of the steam exhausted from the filter exceeds the temperature of steam entering said filter is a function of the rate of flow of steam through the filter.

27. The method as called for in claim 24, wherein the steam in step c enters said filter at atmospheric pressure and at the temperature of boiling water.

* * * * *